United States Patent
Liu et al.

(10) Patent No.: US 7,038,833 B1
(45) Date of Patent: May 2, 2006

(54) ENCAPSULATED BICHROMAL BALLS

(75) Inventors: Ping Liu, Mississauga (CA); Nan-Xing Hu, Oakville (CA); Naveen Chopra, Oakville (CA); Peter M. Kazmaier, Mississauga (CA)

(73) Assignee: Xerox Corporation, Stamford, CT (US)

( * ) Notice: Subject to any disclaimer, the term of this patent is extended or adjusted under 35 U.S.C. 154(b) by 18 days.

(21) Appl. No.: 11/042,284

(22) Filed: Jan. 25, 2005

(51) Int. Cl.
*G02B 26/00* (2006.01)
*G09G 3/34* (2006.01)

(52) U.S. Cl. ............... 359/296; 359/290; 345/107; 428/402.2

(58) Field of Classification Search ........... 359/296, 359/290; 345/107; 428/402.2; 427/213.3
See application file for complete search history.

(56) References Cited

U.S. PATENT DOCUMENTS

| | | | |
|---|---|---|---|
| 3,215,572 A | 11/1965 | Papell | 149/2 |
| 3,697,437 A | 10/1972 | Fogle et al. | 427/213.33 |
| 4,880,720 A | 11/1989 | Drappel et al. | 430/115 |
| 5,037,716 A | 8/1991 | Moffat | 430/110.2 |
| 5,262,098 A | 11/1993 | Crowley et al. | 264/8 |
| 5,344,594 A | 9/1994 | Sheridon | 264/4.1 |
| 5,604,027 A | 2/1997 | Sheridon | 264/4.1 |
| 5,708,525 A | 1/1998 | Sheridon | 264/4.1 |
| 5,717,514 A | 2/1998 | Sheridon | 264/4.1 |
| 5,739,801 A | 4/1998 | Sheridon | 264/4.1 |
| 5,754,332 A | 5/1998 | Crowley | 359/296 |
| 5,815,306 A | 9/1998 | Sheridon et al. | 359/296 |
| 5,900,192 A | 5/1999 | Richley | 264/8 |
| 5,976,428 A | 11/1999 | Richley | 264/10 |
| 5,989,629 A | 11/1999 | Sacripante et al. | 427/180 |
| 6,054,071 A | 4/2000 | Mikkelsen, Jr. | 264/1.36 |
| 6,067,185 A | 5/2000 | Albert et al. | 359/296 |
| 6,235,395 B1 | 5/2001 | Sacripante et al. | 428/403 |
| 6,249,271 B1 | 6/2001 | Albert et al. | 345/107 |
| 6,406,747 B1 | 6/2002 | Biegelsen et al. | 427/213.34 |
| 6,419,982 B1 | 7/2002 | Sacripante et al. | 427/220 |
| 6,445,490 B1 | 9/2002 | Chopra et al. | 359/296 |
| 6,488,870 B1 | 12/2002 | Chopra et al. | 264/4.1 |
| 6,514,328 B1 * | 2/2003 | Katoh et al. | 106/31.28 |
| 6,549,327 B1 | 4/2003 | Foucher et al. | 359/296 |
| 6,703,074 B1 | 3/2004 | Sacripante et al. | 427/220 |
| 2005/0129946 A1 * | 6/2005 | Hayashi | 428/402.2 |

* cited by examiner

*Primary Examiner*—Timothy Thompson
(74) *Attorney, Agent, or Firm*—Eugene O. Palazzo; Fay, Sharpe, Fagan, Minnich & McKee, LLP

(57) ABSTRACT

Disclosed is an encapsulant oil and associated method for producing encapsulated bichromal balls or particles. In this regard, bichromal balls are encapsulated within a mixture of low viscosity polysiloxane oil and a bifunctional component material. The bifunctional component material includes a hydrocarbon functional group to provide suitable wettability with the balls or particles and a siloxane functional group which is compatible with the siloxane oils.

20 Claims, 2 Drawing Sheets

ENCAPSULATED BICHROMAL BALLS

BACKGROUND

Illustrated herein, in various embodiments, are methods for preparing encapsulated bichromal balls and/or other rotatable elements, such as bichromal beads, spheres, etc., and the encapsulated products produced thereby. These methods and encapsulated products find particular application in conjunction with display devices and substrates using bichromal balls, and will be described with particular reference thereto. However, it is to be appreciated that the present exemplary embodiments are also amenable to other like applications.

Bichromal rotatable elements, such as bichromal balls or beads (or Gyricon balls or beads as sometimes referred to in the art), are tiny spheres, such as micron-sized wax beads, which have an optical and an electrical anisotropy. These characteristics generally result from each hemisphere surface or side having a different color, such as black on one side and white on the other, and electrical charge, i.e., positive or negative. Depending on the electrical field produced, the orientation of these beads will change, showing a different color (such as black or white) and collectively create a visual image. A wide assortment of different color combinations (black/white, blue/white, red/white, blue/yellow, etc.) are possible making the products useful for the fabrication of display devices, such as electrophoretic or photochromic displays.

In this regard, the spherical particles are generally embedded in a solid substrate with a slight space between each ball and the substrate being filled with a liquid so that the balls are free to rotate in a changing electrical field, but can not migrate from one location to another so as to disrupt the arrangement of rotatable elements. If one hemisphere of the balls is one color (i.e., black), and the other is a different color (i.e., white), each pixel can be turned on and off by the electrical field applied to that location. As a result, each pixel can be individually addressed, and a full page image can thus be generated.

For example, reusable signage or displays can be produced by incorporating the tiny bichromal beads in a substrate such as sandwiched between thin sheets of a flexible elastomer and suspended in an emulsion. The beads reside in their own cavities within the flexible sheets of material. Alternatively, the tiny bichromal beads or balls can be encapsulated in a suspending or electrophoretic fluid. The encapsulated bichromal beads or balls can be affixed to a support to form a display device. Under the influence of a voltage applied to the surface, the beads will rotate to present one side or the other to the viewer to create an image. The image stays in place until a new voltage pattern is applied using software, which erases the previous image and generates a new one. This results in a reusable signage or display that is electronically writable and erasable. This is sometimes referred to as "electric paper" or "e-paper".

Numerous patents describe bichromal balls, their manufacture, incorporation in display systems or substrates, and related uses and applications. Exemplary patents include, but are not limited to: U.S. Pat. Nos. 5,262,098; 5,344,594; 5,604,027 reissued as U.S. Pat. Nos. Re 37,085; 5,708,525; 5,717,514; 5,739,801; 5,754,332; 5,815,306; 5,900,192; 5,976,428; 6,054,071; 5,989,629; 6,067,185; 6,235,395; 6,419,982; 6,488,870; 6,445,490; 6,549,327; and 6,703,074; all of which are hereby incorporated by reference.

Hydrocarbon oils such as ISOPAR M have been used as encapsulant liquids or fluids for bichromal balls in "electric paper" available from Gyricon, LLC. However, the long-term stability of bichromal balls in ISOPAR oils has been a concern. As a result, polysiloxane oils have been used as encapsulant liquids or fluids in place of ISOPAR oils in some current electric paper displays. However, polysiloxane oils are difficult to encapsulate together with the waxy bichromal beads to form uniform encapsulated bichromal balls. The poor compatibility of the waxy beads and low viscosity polysiloxane oil often fails to produce the desired encapsulated balls. Hence, a need remains for an encapsulant liquid or suspending fluid with improved properties and long-term stability.

BRIEF DESCRIPTION

In one embodiment, encapsulated bichromal balls are provided. The encapsulated balls include a suspending fluid, comprising a low viscosity polysiloxane oil and a bifunctional component material, and a bichromal ball encapsulated with an encapsulating shell material.

In another embodiment, a method of forming encapsulated electrophoretic particles or bichromal balls is disclosed. The method comprises: providing electrophoretic particles such as bichromal balls; blending the particles with (i) a low viscous polysiloxane oil, and (ii) an effective amount of a bifunctional component material; providing a shell material; and, forming capsules by encapsulating said particles, polysiloxane oil, and bifunctional component material within a shell of said shell material. The encapsulated particles or bichromal balls produced by this method are also disclosed herein.

In a further embodiment, a suspending fluid for use with bichromal balls is provided. The fluid comprises low viscosity polysiloxane oil and a bifunctional component material.

In still another embodiment, an additional encapsulation process is provided. The process comprises: (i) forming an emulsion of a continuous aqueous phase comprising water, a cationic material, and an anionic material, and a disperse phase comprising a plurality of droplets of a silicon oil, included therein one or more particles, wherein said silicon oil further contains an additive material comprised of a polysiloxane having an organic component capable of absorbing on the surface of the particles; (ii) forming a gellation shell around each of the droplets from the complex coacervation of the cationic material and the anionic material; and, (iii) hardening the gellation shell. The encapsulated particles formed by this process are also included herein.

These and other non-limiting aspects of the development are more particularly disclosed below.

BRIEF DESCRIPTION OF THE DRAWINGS

The following is a brief description of the drawings, which are presented for the purposes of illustrating the development disclosed herein and not for the purposes of limiting the same.

DETAILED DESCRIPTION

Figure 1:
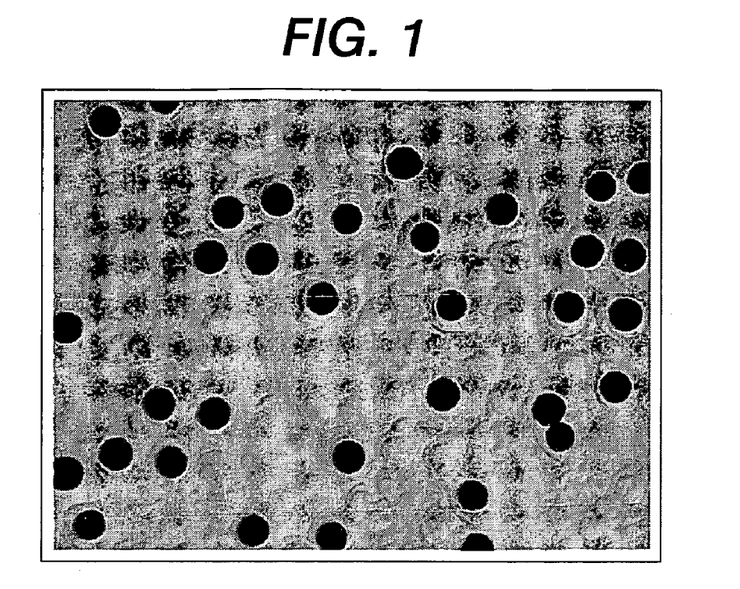
FIG. 1 is a photomicrograph showing the encapsulated bichromal beads shown after the beads are added (48×)
Figure 2:
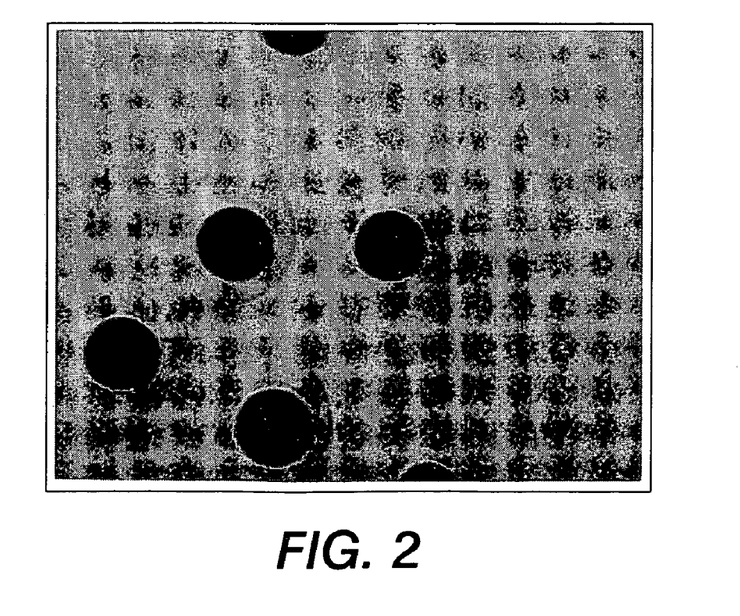
FIG. 2 is photomicrograph illustrating the encapsulated bichromal beads before drying (106×)
Figure 3:
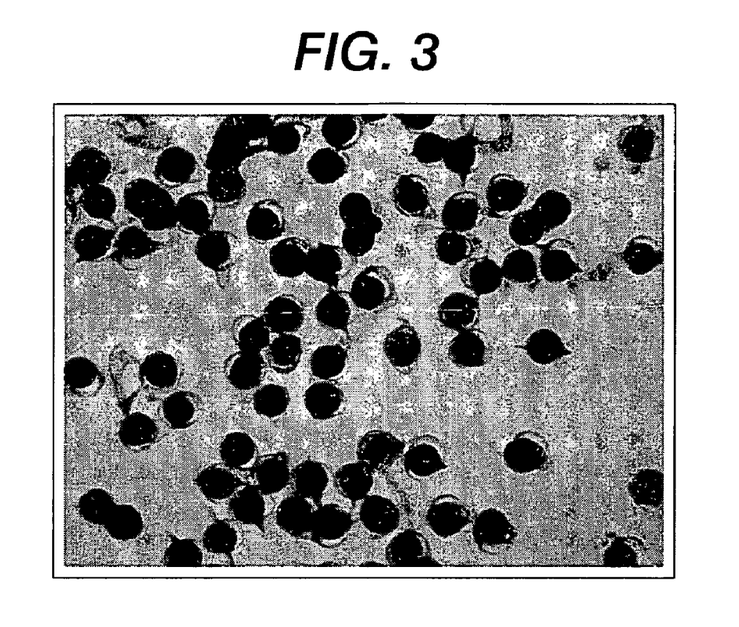
FIG. 3 is a photomicrograph showing the encapsulated bichromal beads after drying (125–106 um, 48×); and, FIG. 4 is a photomicrograph illustrating the encapsulated bichromal beads after drying (150–125 um, 48×).
Figure 4:
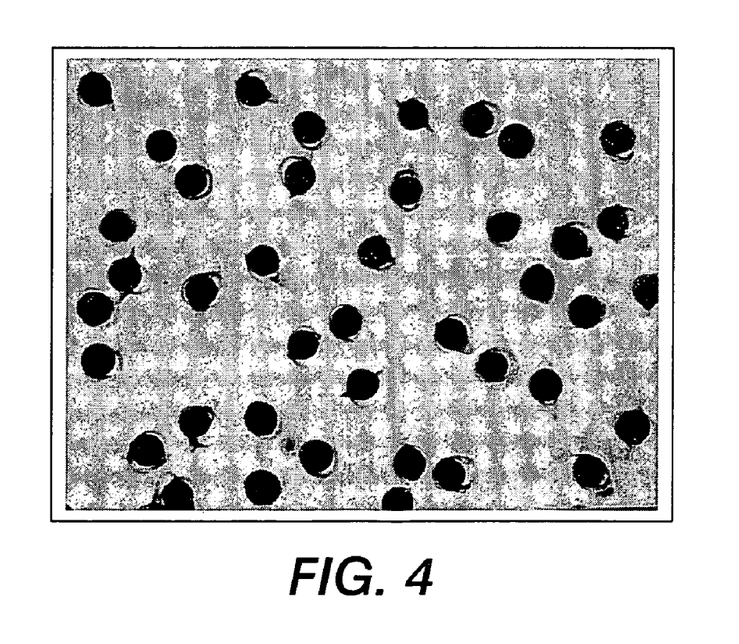

The present disclosure relates to a method for the encapsulation of bichromal balls and/or other rotatable elements, such as beads, spheres, etc., in low viscous siloxane oils. The method utilizes one or more low viscosity polysiloxane oils and a material having a bifunctional component (i.e., a bifunctional component material) to produce encapsulated bichromal balls. The bifunctional component material includes a hydrocarbon functional group to provide suitable wetability with the balls and/or electrophoretic particles. The bifunctional component material also includes a siloxane functional group which is compatible with the silicone oils. As a result of the enhanced compatibility produced by this siloxane oil mixture, smaller encapsulations can be produced. The resulting encapsulated bichromal balls exhibit additional advantages such as long storage shell life, good device operation stability, and improved display performance.

The present development further provides a process for the encapsulation of bichromal balls in a suspending, or electrophoretic fluid, comprising low viscous polysiloxane oil and a small amount of a bifunctional component material. Suitable examples of such low viscous polysiloxane oils include hexamethyldisiloxane oil, octamethyltrisiloxane oil, and poly(dimethylsiloxane) oil and combinations thereof. Commercial examples of such polysiloxane oils include Dow Corning 200 ®-fluid series (i.e., 1 Centistoke 200 oil, 2 Centistoke 200 oil, etc.) as well as mixtures thereof. The viscosities of these polysiloxane oils generally range from about 0.3 cst to about 50 cst, including from about 0.5 cst to about 10 cst.

Some of the further properties that the polysiloxane oils included in this disclosure exhibit chemical compatibility with the electrophoretic particles and/or balls and capsule materials; low dielectric constant (i.e., about 2 or less); high volume resistivity (i.e., about 10–15 ohm-cm); low toxicity; low water solubility; and have a similar density, as well as refractive index, to that of the electrophoretic particles.

Additionally, this development also includes the incorporation of a small amount of a bifunctional component material, which contains a hydrocarbon functional group to provide suitable wetability with the balls, and a siloxane functional group to provide good compatible properties with the polysiloxane oils. Any materials with such functionalities may be used, such as poly(dimethysiloxane) terminated with a hydrocarbon group, copolymers (preferably block copolymers) of poly(dimethylsiloxane) with polyolefin, or comb-type copolymers with pendant poly(dimethylsiloxane) groups, and the like. Illustrative examples of such bifunctional components for the purpose include, for example, structures (I) and (II) as set forth below:

Structure I: Polysiloxane monoterminated with hydrocarbon group

Structure II: Polysiloxane bisterminated with hydrocarbon groups wherein $R1$ and $R2$ represent individually alkyl groups having from about 1 to about 4 carbons or phenyl groups; $R3$ and $R4$ represent alkyl groups having from about 6 to about 30 carbons, or alkylphenyl groups, and the like, wherein said alky and alkylphenyl groups may further contain a heteroatom selected, for example, from the group consisting of oxygen, sulfur, nitrogen, and silicon; and n is an integer number of from about 6 to about 100.

An example of a material having such a bifunctional component, which contains a hydrocarbon functional group to provide suitable wetability to the electrophoretic particles (or bichromal or Gyricon beads or balls), and a siloxane functional group to provide good compatible properties with the polysiloxane oils is poly(dimethysiloxane), disterate terminate, which is available from commercial sources such as Aldrich Chemical Co., Inc. Milwaukee, Wis. As illustrated below, this composition exhibits enhanced compatibility with the balls/beads and polysiloxane oil.

Another example of such a bifunctional component material is poly(dimethylsiloxane), bis(12-hydroxy stearate) terminated, which is also available from commercial sources such as Aldrich. The dual compatibility of this component is also noted below.

Along these lines, it has been found that only a relatively small amount of materials having the bifunctionalities noted above are necessary for enhancing various characteristics of the encapsulated bichromal beads or balls. Preferably, the amount of the materials having such a bifunctional characteristics is from about 0.1 weight percent to about 30 weight percent of the total polysiloxane oil, including from about 0.5 weight percent to about 10 weight percent of polysiloxane oil, and from about 1 weight percent to about 5 weight percent of polysiloxane oil. This range will ultimately depend on the particular polysiloxane oils, bichromal beads, etc., and/or system utilized.

Additionally, when utilized as a suspending fluid, the low viscosity polysiloxane oil and the bifunctional component material may also include other agents or additives, such as charge control agents, surface modifiers, particle stabilizers, etc. Further additives to the fluid include ultraviolet light absorption additives.

It can be advantageous in some displays for the suspending fluid to contain an optically absorbing dye. This dye must be soluble in the fluid, but will generally be insoluble in the other components of the capsule. There is much flexibility in the choice of dye material. The dye can be a pure compound, or blends of dyes to achieve a particular color, including black. The dyes can be fluorescent, which would produce a display in which the fluorescence properties depend on the position of the particles. The dyes can be photoactive, changing to another color or becoming colorless upon irradiation with either visible or ultraviolet light, providing another means for obtaining an optical response.

There are many dyes that can be chosen for use in encapsulated electrophoretic display. Properties important here include light fastness, solubility in the suspending liquid, color, and cost. These are generally from the class of azo, anthraquinone, and triphenylmethane type dyes and may be chemically modified so as to increase the solubility in the oil phase and reduce the absorption by the particle surface.

The fluid must be capable of being formed into small droplets prior to a capsule being formed. Processes for forming small droplets include flow-through jets, membranes, nozzles, or orifices, as well as shear-based emulsifying schemes. The formation of small drops may be assisted by electrical or sonic fields. Surfactants and polymers can be used to aid in the stabilization and emulsification of the droplets in the case of an emulsion type encapsulation.

The capsules prepared by the encapsulation process in accordance with the present development include, in addition to one or more species of charged, colored electrophoretic particles, one or more low viscosity siloxane oils and a small amount of one or more bifunctional component materials. Several different types of encapsulation processes (i.e., complex coacervation, etc.) can be utilized to produce capsules containing the particles, the siloxane oils and the bifunctional components. These are disclosed in more detail below. By controlling the process parameters, the encapsulation process of the present discovery is capable of producing capsules varying in size from about 20 to about 500 microns, including from about 100 to about 300 microns, typically from about 100 to about 150 microns.

Also disclosed herein are particles that, used in electronic display devices, are encapsulated in a low viscous siloxane oil. The particles are hemispheric bichromal balls which have an optical and an electrical anisotropy due to each hemisphere surface having a different color (e.g., one hemisphere is white and the other hemisphere is black) and electrical charge. The bichromal balls are free to rotate within the capsules in response to an applied electrical field. The bichromal balls are comprised, for example, of the following illustrative materials: as the matrix, a polarizable material such as a polymer or a wax-like polyethylene was may be used; the white pigment may be titanium dioxide; and the black pigment may be magnetite ($Fe_2O_3$) or carbon black. Bichromal balls and their fabrication are described in U.S. Pat. Nos. 5,262,098; 5,344,594; and, 5,604,027, the disclosures of which are totally incorporated herein by reference. In other embodiments, the bichromal balls can be made with made with magnetic anisotropy so that they are free to rotate within the microcapsules in response to an applied magnetic field.

The electrophoretic particles may be composed of any suitable material, where the composition of the particles depends on their intended use. The type of particles used will depend on the color of the display image that is required. The particles are submicron in size. The particles should be charged or capable of acquiring a charge, i.e. exhibit electrophoretic mobility. Particles that may be used include pigments such as, but not limited to, titania, carbon black, etc., or dyed pigments, polymers or pigment/polymer composites.

Electrophoretic particles useful in the art of liquid toners or electrophoretic displays may be used in the present discovery and comprise composite particles of a pigment and a resin. Examples of suitable resins include polyethylene and polypropylene and their copolymers, including ethylene-vinyl acetate copolymers and combinations thereof. Examples of suitable pigments include rutile titania, anatase titania, barium sulfate, zinc oxide, carbon black, Sudan blue, Hostaperm pink, etc., and combinations thereof.

Additional examples of electrophoretic particles include, but are not limited to, particles of a pigment and a resin. Examples of suitable resins include polyethylene and polypropylene and their copolymers, including ethylene-vinyl acetate copolymers such as the Elvax® I resins available from E.I. DuPont Corporation, copolymers of ethylene and an $\alpha$, $\beta$-ethylenically unsaturated acid selected from acrylic or methacrylic acid, where the acid moiety is present in an amount of from 0.1 to 20 percent by weight, such as the Elvax® II resins available from E.I. DuPont Corporation, chlorinated olefins such as chlorinated polypropylene, including CP-343-1, available from Eastman Kodak Company, poly-$\alpha$-olefins such as polyoctadecene and polyhexadecene, and the like. Within the particles, the resin is generally present in an amount of from about 60 to about 95, and preferably from about 70 to about 90, percent by weight with respect to the pigment. Examples of suitable pigment materials include Raven® 5750 and Raven® 3500, available from Columbian Chemicals Company, Mogul L, available from Cabot Corporation, Regal® 330 carbon black, available from Cabot Corporation, Vulcan XC-72R, available from Cabot Corporation, Sudan Blue OS, available from Ciba-Geigy Inc., Hostaperm Pink E, available from American Hoechst Corporation, Novaperm 3010, available from American Hoechst Corporation, Lithol Rubine DCC-2734, available from Dominion Color Company, Toner 8200, available from Paul Uhlich & Company, Toner 8200, and the like.

Generally, any pigment material is suitable provided that it consists of small particles and that it combines effectively with the polymeric resin material. Pigments, however, can affect the charging characteristics of the particles, and a pigment of the desired color must be chosen such that it imparts to the particles a charge of the desired polarity and magnitude when mixed with a specific charge director. A specific pigment may result in a particle charging either positively or negatively, depending upon the charge director used. The particles should have an average particle diameter of from about 0.1 micron to about 10 microns, and preferably from about 0.5 to about 3 microns, as determined by a Horiba CAPA-500 centrifugal particle size analyzer, available from Horiba Instruments, Inc., Irvine, Calif., which determines average volume particle diameter. The particles may be present in amounts of from about 0.5 to about 8, and preferably from about 2 to about 4, percent by weight of the composition of the particles.

In certain embodiments, the electrophoretic particles can be neat pigments, dyed (laked) pigments or pigment/polymer composites, or any other component that is charged or capable of acquiring a charge. Typical considerations for the electrophoretic particle are its optical properties, electrical properties, and surface chemistry. The particles may be organic or inorganic compounds, and they may either absorb light or scatter light. The particles may further include scattering pigments, absorbing pigments and luminescent particles. The particles may be retroreflective, such as corner cubes, or they may be electroluminescent, such as zinc sulfide particles, which emit light when excited by an AC field, or they may be photoluminescent. Finally, the particles may be surface treated so as to improve charging or interaction with a charging agent, or to improve dispersibility.

One type of exemplary particle is titania. The titania particles may be coated with a metal oxide, such as aluminum oxide or silicon oxide, for example. The titania particles may have one, two, or more layers of metal-oxide coating. For example, a titania particle may have a coating of aluminum oxide and a coating of silicon oxide. The coatings may be added to the particle in any order.

The electrophoretic particle is usually a pigment, a polymer, a laked pigment, or some combination of the above. A neat pigment can be any pigment, and, usually for a light colored particle, pigments such as, for example, rutile (titania), anatase (titania), barium sulfate, kaolin, or zinc oxide are useful. Some typical particles have high refractive indices, high scattering coefficients, and low absorption coefficients. Other particles are absorptive, such as carbon black or colored pigments used in paints and inks. The pigment should also be insoluble in the suspending fluid. Yellow pigments such as diarylide yellow, hansa yellow, and benzidin yellow have also found use in similar displays. Any other reflective material can be employed for a light colored particle, including non-pigment materials, such as metallic particles.

Useful neat pigments include, but are not limited to, $PbCrO_4$, Cyan blue GT 55-3295 (American Cyanamid Company, Wayne, N.J.), Cibacron Black BG (Ciba Company, Inc., Newport, Del.), Cibacron Turquoise Blue G (Ciba), Cibalon Black BGL (Ciba), Orasol Black (BRG (Ciba), Orasol Black RBL (Ciba), Acetamine Black, CBS (E.I. duPont de Nemours and Company, Wilmington, Del.), Crocein Scarlet N Ex (E.I. du Pont de Nemours and Company) (27290), Fiber Black VF (duPont) (30235), Luxol Fast Black L (duPont) (Solv. Black 17), Nirosine Base No. 424 (E.I. du Pont de Nemours) (50415B), Oil Black BG (E.I. du Pont de Nemours) (Solv. Black 16), Rotalin Black RM (E.I. du Pont de Nemours), Sevron Brilliant Red 3 B (E.I. du Pont de Nemours); Basic Black DSC (Dye Specialties, Inc.), Hectolene Black (Dye Specialties, Inc.), Azosol Brilliant Blue B (GAF, Dyestuff and Chemical Division, Wayne, N.J.) (Solv. Blue 9), Azosol Brilliant Green BA (GAF) (Solv. Green 2), Azosol Fast Brilliant Red B (GAF), Azosol Fast Orange RA Conc. (GAF) (Solv. Orange 20), Azosol Fast Yellow GRA Conc. (GAF) (13900 A), Basic Black KMPA (GAF), Benzofix Black CW—CF (GAF) (35435), Cellitazol BNFV Ex Soluble CF (GAF) (Disp. Black 9), Celliton Fast Blue AF Ex Conc (GAF) (Disp. Blue 9), Cyper Black IA (OAF) (Basic Blk. 3), Diamine Black CAP Ex Conc (GAF) (30235), Diamond Black EAN Hi Con. CF (GAF) (15710), Diamond Black PBBA Ex (GAF) (16505); Direct Deep Black EA Ex CF (GAF) (30235), Hansa Yellow G (GAF) (11680); Indanthrene Black BBK Powd. (GAF) (59850), Indocarbon CLOS Conc. CF (GAF) (53295), Katigen Deep Black NND Hi Conc. CF (GAF) (15711), Rapidogen Black 3 G (OAF) (Azoic Blk. 4); Sulphone Cyanine Black BA-CF (GAF) (26370), Zamkbezi Black VD Ex Conc. (GAF) (30015); Rubanox Red CP-1495 (The Sherwin-Williams Company, Cleveland, Ohio) (15630); Raven 11 (Columbian Carbon Company, Atlanta, Ga.), (carbon black aggregates with a particle size of about 25 µm), Statex B-12 (Columbian Carbon Co.) (a furnace black of 33 µm average particle size), and chrome green.

Particles may also include laked, or dyed, pigments. Laked pigments are particles that have a dye precipitated on them or which are stained. Lakes are metal salts or readily soluble anionic dyes. These are dyes of azo, triphenylmethane or anthraquinone structure containing one or more sulphonic or carboxylic acid groupings. They are usually precipitated by a calcium, barium or aluminum salt onto a substrate. Typical examples are peacock blue lake (CI Pigment Blue 24) and Persian orange (lake of CI Acid Orange 7), Black M Toner (GAF) (a mixture of carbon black and black dye precipitated on a lake).

A dark particle of the dyed type may be constructed from any light absorbing material, such as carbon black, or inorganic black materials. The dark material may also be selectively absorbing. For example, a dark green pigment may be used. Black particles may also be formed by staining lattices with metal oxides, such latex copolymers consisting of any of butadiene, styrene, isoprene, methacrylic acid, methyl methacrylate, acrylonitrile, vinyl chloride, acrylic acid, sodium styrene sulfonate, vinyl acetate, chlorostyrene, dimethylaminopropylmethacrylamide, isocyanoethyl methacrylate and N-(isobutoxymethacrylamide), and optionally including conjugated diene compounds such as diacrylate, triacrylate, dimethylacrylate and trimethacrylate. Black particles may also be formed by a dispersion polymerization technique.

In the systems containing pigments and polymers, the pigments and polymers may form multiple domains within the electrophoretic particle, or be aggregates of smaller pigment/polymer combined particles. Alternatively, a central pigment core may be surrounded by a polymer shell. The pigment, polymer, or both can contain a dye. The optical purpose of the particle may be to scatter light, absorb light, or both. Useful sizes may range from 1 nm up to about 100 µm, as long as the particles are smaller than the bounding capsule. The density of the electrophoretic particle may be substantially matched to that of the suspending (i.e., electrophoretic) fluid. As defined herein, a suspending fluid has a density that is "substantially matched" to the density of the particle if the difference in their respective densities is between about zero and about two g/ml. This difference is preferably between about zero and about 0.5 g/ml.

Useful polymers for the particles include, but are not limited to: polystyrene, polyethylene, polypropylene, phenolic resins, E.I. du Pont de Nemours Elvax resins (ethylenevinyl acetate copolymers), polyesters, polyacrylates, polymethacrylates, ethylene acrylic acid or methacrylic acid copolymers (Nucrel Resins—E.I. du Pont de Nemours, Primacor Resins—Dow Chemical), acrylic copolymers and terpolymers (Elvacite Resins, E.I. du Pont de Nemours) and PMMA. Useful materials for homopolymer/pigment phase separation in high shear melt include, but are not limited to, polyethylene, polypropylene, polymethylmethacrylate, polyisobutylmethacrylate, polystyrene, polybutadiene, polyisoprene, polyisobutylene, polylauryl methacrylate, polystearyl methacrylate, polyisobornyl methacrylate, poly-t-butyl methacrylate, polyethyl methacrylate, polymethyl acrylate, polyethyl acrylate, polyacrylonitrile, and copolymers of two or more of these materials. Some useful pigment/polymer complexes that are commercially available include, but are not limited to, Process Magenta PM 1776 (Magruder Color Company, Inc., Elizabeth, N.J.), Methyl Violet PMA VM6223 (Magruder Color Company, Inc., Elizabeth, N.J.), and Naphthol FGR RF6257 Magruder Color Company, Inc., Elizabeth, N.J.).

The pigment-polymer composite may be formed by a physical process, (e.g., attrition or ball milling), a chemical process (e.g., microencapsulation or dispersion polymerization), or any other process known in the art of particle production. From the following non-limiting examples, it may be seen that the processes and materials for both the fabrication of particles and the charging thereof are generally derived from the art of liquid toner, or liquid immersion development. Thus any of the known processes from liquid development are particularly, but not exclusively, relevant.

New and useful electrophoretic particles may still be discovered, but a number of particles already known to those skilled in the art of electrophoretic displays and liquid toners can also prove useful. In general, the polymer requirements for liquid toners and encapsulated electrophoretic inks are similar, in that the pigment or dye must be easily incorporated therein, either by a physical, chemical, or physicochemical process, may aid in the colloidal stability, and may contain charging sites or may be able to incorporate materials which contain charging sites. One general requirement from the liquid toner industry that is not shared by encapsulated electrophoretic inks is that the toner must be capable of "fixing" the image, i.e., heat fusing together to create a uniform film after the deposition of the toner particles.

Further examples of suitable electrophoretic particles may be found in U.S. Pat. No. 4,880,720 and U.S. Pat. No. 6,249,271, col. 12, line 52 to col. 15, line 23; the disclosures of which are hereby incorporated in their entirety.

The electrophoretic particles can include colloidal dispersions of fine powdered magnetic materials such as, but not limited to, ferrite, nickel, cobalt, iron, or various oxides thereof such as magnetite in a suitable polymeric binder. These particles will be able to migrate in a fluid in response to the application of a magnetic field. For example, various powdered magnetic materials such as nickel, cobalt, iron or various iron oxides may be used; including the black oxide of iron, magnetite ($Fe_3O_4$). The particle size of the magnetic particles preferably should be less than 0.25 micron in diameter to insure that a true colloid is formed and, advantageously, may include particles of less than 0.10 micron in diameter.

Although extremely fine particle sizes are obtainable by several known processes (e.g.: vacuum deposition, condensation, and chemical precipitation or combination), grinding has been found to be a simple and satisfactory method for obtaining a colloidal suspension of the magnetized iron particles. Dispersion is accomplished by grinding commercially obtained powdered magnetite (a particle size of approximately 30 microns) in a ball mill in the presence of a grinding agent, which prevents agglomeration or welding of the minute particles as grinding progresses. Generally, the grinding aid should comprise between 2 to 10 percent by weight of the metal particles and the grinding process continues until the colloid solution is composed of 0.5 to 10 percent by weight of suspended magnetic particles. Further reference can be found in U.S. Pat. No. 3,215,572, hereby incorporated by reference.

The type of particles used will depend on the color of the desired image. These particles are generally submicron in size. They may be highly effective in scattering light (such as titania) while other particles may be highly absorptive (such as carbon black). The particles should be charged or capable of acquiring a charge of the desired polarity and magnitude when mixed with a specific charge control additive. The pigments should effectively disperse the polymeric resin material.

Charge control additives are optionally used to provide and/or enhance the charge of electrophoretic particles to yield good electrophoretic mobility. Charge control additives suitable for the present discovery include, but are not limited to, iron naphthenate and zirconium octoate, lecithin, barium petronate, and the like.

A wide variety of encapsulation processes can be utilized to form the encapsulated bichromal materials. The processes fall into several general categories, all of which can be applied to the present development: interfacial polymerization, in situ polymerization, physical processes, such as coextrusion and other phase separation processes, in-liquid curing, and simple/complex coacervation.

Numerous materials and processes should prove useful in formulating displays of the present development. Useful materials for simple coacervation processes include, but are not limited to, gelatin, polyvinyl alcohol, polyvinyl acetate, and cellulosic derivatives, such as, for example, carboxymethylcellulose. Useful materials for complex coacervation processes include, but are not limited to, gelatin, acacia, carageenan, carboxymethylcellulose, hydrolyzed styrene anhydride copolymers, agar, alginate, casein, albumin, methyl vinyl ether co-maleic anhydride, and cellulose phthalate. Useful materials for phase separation processes include, but are not limited to, polystyrene, PMMA, polyethyl methacrylate, polybutyl methacrylate, ethyl cellulose, polyvinyl pyridine, and poly acrylonitrile. Useful materials for in situ polymerization processes include, but are not limited to, polyhydroxyamides, with aldehydes, melamine, or urea and formaldehyde; water-soluble oligomers of the condensate of melamine, or urea and formaldehyde; and vinyl monomers such as, for example, styrene, MMA and acrylonitrile. Finally, useful materials for interfacial polymerization processes include, but are not limited to, diacyl chlorides, such as, for example, sebacoyl, adipoyl, adipoyl, and di- or poly-amines or alcohols, and isocyanates. Useful emulsion polymerization materials may include, but are not limited to, styrene, vinyl acetate, acrylic acid, butyl acrylate, t-butyl acrylate, methyl methacrylate, and butyl methacrylate.

In the context of the present development, one skilled in the art will select an encapsulation procedure and wall material based on the desired capsule properties. These properties include the distribution of capsule radii; electrical, mechanical, diffusion, and optical properties of the capsule wall; and chemical compatibility with the internal phase of the capsule.

The encapsulation process is preferably by complex coacervation. When complex coacervation is employed, cationic and anionic materials are used to form the capsule material. The cationic material and the anionic material are oppositely charged polyelectrolytes which upon mixing will form a polyelectrolyte complex with low solubility in water, leading to coacervation and formation of a protective microencapsulating shell around each droplet. Suitable polyelectrolytes for the cationic material and the anionic material include, for example, polyphosphates (e.g., polyphosphorylated carbohydrates) and polycarboxylates (e.g., polyacrylates and polymethacrylates), which may be combined with cationic polymers such as poly-N-ethyl-4-vinylpyridine or poly-2,5-ionene bromide.

Other examples of anionic polymers are polysaccharides and their derivatives such as acacia (gum arabic), carrageenan, agarose, alginic acid and salts thereof, heparin, hyaluronan, pectins and their derivatives such as sodium amylosulphate. These may be combined with cationic materials such as chitosan or cationic cellulose derivatives, e.g., from hydroxyethylcellulose, such as Polymer JR (Union Carbide). Further examples of the anionic material are inorganic salts. The inorganic salt may be, for instance, a polyphosphate. Inorganic polyphosphate materials include, for example, alkali metal phosphates, phosphate glasses, alkali metal hexametapolyphosphates such as sodium hexametaphosphates (trade name CALGON). Other inorganic polyphosphates include HYPHOS ($Na_{12}P_{10}O_{31}$, which contains 65 wt % $P_2O_5$), HEXATREN R, and HEXATREN N, including those disclosed in U.S. Pat. Nos. 6,488,870 and 3,697,437, the disclosures of which are totally incorporated herein by reference.

While complex coacervation is generally used to encapsulate the electrophoretic particles as described herein, alternative encapsulation processes are also feasible. As the shell of the encapsulated bichromal elements, a polymeric shell is typical. While any suitable polymer material may be used without limitation for the shell, the shell can be a polymer derived from two monomers that can be dissolved, respectively, in two mutually immiscible solvents (such as, for example, organic solvents and water). This enables the polymer to be formed at the interface of the two solvents via interfacial condensation polymerization, as more fully explained below.

Shell polymers suitable for use with the embodiments described herein include those which may be formed in an interfacial condensation. polymerization process. Typical shell polymers include polyureas, polyurethanes, polyesters, thermotropic liquid crystalline polyesters, polycarbonates, polyamides, polysulfones, and the like, or mixtures of these polymers such as poly(urea-urethanes), poly(esteramides), and the like, which can be formed in a polycondensation reaction of suitably terminated prepolymers or macromers with different condensation monomers. For example, a preformed alcohol terminated urethane prepolymer can be copolymerized with a diacyl halide to form a poly(esterurethane) in an interfacial reaction, or an amine terminated amide prepolymer can be copolymerized with a diisocyanate to produce a poly(urea-amide) copolymer. Epoxy monomers or oligomers such as Epikote 819 can also be added in amounts of from about 0.01 percent to about 30 percent to copolymerize into the shell as strengthening agents. Various polyfunctional shell monomers, such as triamines, triisocyanates, and triols can be employed in small quantities of from about 0.01 percent to about 30 percent as crosslinking agents to introduce rigidity and strength into the shells. Shell polymers can also be formed by the reaction of aliphatic diisocyanates, such as meta-tetramethylene diisocyanate and a polyamine, reference for example the U.S. Pat. No. 5,037,716, incorporated herein by reference in its entirety.

Particularly, the polymer shell material is comprised of a polyamide (from, e.g., diacid chloride and diamine monomers), a polyester (from, e.g., diacid chloride and diol monomers), a polyurea (from, e.g., diisocyanate and diamine monomers), a polyurethane (from, e.g., diisocyanate and diol monomers) or mixtures thereof. The diacid chloride monomers and diisocyanate monomers may be dissolved in an organic phase, while the diamine and diol monomers may be dissolved in an aqueous phase.

Suitable shell monomers are usually selected from monomers where the number of chemical reacting groups per molecule is two or more. The number of reacting groups per molecule is referred to as the chemical functionality. An organic soluble shell monomer, which has a functionality of 2 or more, reacts with an aqueous soluble shell monomer, which has a functionality of 2 or more, via interfacial condensation polymerization to generate the shell polymer in an embodiment of the present discovery.

The organic soluble shell monomer can include (1) diisocyanates such as, for example, toluene diisocyanate, nexamethylene diisocyanate, trans-1,4-cyclohexane diisocyanate, meta-tetrametbylxylene diisocyanate (m-TMXDI), trimethylhexamethylene diisocyanate (TMDI), nexane diisocyanate (HDI), 4,4'-dicyclohexylmethane diisocyanate (Desmodur W), 4,4'-methyldiphenyl diisocyanate and even diisocyanate prepolymers such as polyether based liquid urethane prepolymer such as the Adiprene series available from DuPont; XPS and XPH series which are toluene diisocyanate terminated polyethylene oxide prepolymers available from Air Product, or (2) diacid chlorides (or, more generally, diacid halides), such as, for example, sebacoyl chloride, terephthaloyl chloride, phthaloyl chloride, isophthaloyl chloride, azeloyl chloride, glutaryl chloride and/or adipoly chloride. Examples of organic soluble shell monomers which have a functionality greater than 2 include 1,3,5-benzenetricarboxylic acid chloride; Isonate 143 L (liquid MDI based on 4,4'-methyldiphenyl diisocyanate) purchased from The Upjohn Company; and tris(isocyanatophenyl) thiophosphate (Desmodur RF) purchased from Mobay Chemical Corporation.

Examples of monomers soluble in aqueous media and with a functionality of two (2) include (1) diamines such as, for example, 1,6-hexanediamine, hexamethylenediamine, 1,4-bis(3-aminopropyl)piperazine, 2-methylpipeazine, mxylene-α,α'-diamine, 3,3'-diamino-N-methyldipropylamine, 1,3-cyclohexanebis(methylamine), 1,4-diaminocyclohexane, 2-methylpentamethylene diamine, 2-methylpentanediamine (Dytek A) purchased from DuPont, 1,2-diaminocyclohexane, 1,3-diaminopropane, 1,4-diaminobutane, 2,5-dimethylpiperazine, piperazine, fluorine-containing 1,2-diaminobenzenes purchased from PCR Incorporated, and N,N'-dimethylethylenediamine; (2) diols such as bisphenol A, other bisphenols such as 4,4'-biphenol, 4,4-dihydroxydiphenyl ether, 3,3'- and 4,4'(ethylendioxy)diphenol, 3,3'- and 4,4'-(butylenedioxy) diphenol, 4,4'(hexafluoroisopropyldene)diphenol, 3,3'- and 4,4'-dihydroxydiphenyl ether, 3,3'- and 4,4'-biphenol, 4,4'thiobisphenols, 4,4'-[1,3-phenylenebix(1-methylethylidene)]bisphenol, 4,4-'bis(4-hydroxyphenyl)valeric acid and its alkylates, phenolphthalein and 3,3'- and 4,4'methylenediphenols. Other diols which may be used include aliphatic diols such as neopentyl glycol, ethylene glycol, propylene glycol, butylenes glycol, diethylene glycol, dipropylene glycol, or mixtures thereof, or any other water soluble copolycondensation coreactant monomers/prepolymers. Other aqueous soluble shell monomers having a functionality greater than 2 include diethylene triamine, bis(3-aminopropyl)amine, tris(2-aminoethyl)amine (TREN-HP) purchased from W.R. Grace Company, and the like.

More than one organic phase monomer can be used to react with more than one aqueous phase monomer. Although formation of the shell entails reaction in an embodiment between at least two shell monomers, one soluble in organic phase and one soluble in aqueous phase, as many as 5 or more monomers soluble in the organic phase and as many as 5 monomers soluble in aqueous phase can be reacted to form the shell. In some preferred instances, 2 monomers soluble in the organic phase and 2 monomers soluble in aqueous phase can be reacted to form the shell.

Further, optional reaction aids such as catalysts or curing agents, may be added to either of the solutions, if desired. For example, a shell crosslinking agent such as Desmodur RF (Bayer) may be added to the organic phase, if desired, in effective amounts of, for example, from about 0 to about 3 percent by weight of the monomers.

While several methods may be used to derive the encapsulating shell surrounding the dielectric fluid and the bichromal or Gyricon sphere, the process of complex coacervation is typically used. Alternate processes, such as interfacial condensation polymerization can also be used. As mentioned above, interfacial condensation polymerization occurs at the interface between two mutually immiscible solvents, usually an organic based solvent and an aqueous solvent (i.e., a water-based solution).

In one embodiment, the process involves forming the organic solution/dispersion by dispersing the bichromal or Gyricon spheres in a solution containing a low viscous siloxane oil, a monomer dissolved therein for example a diacid chloride or a diisocyanate monomer, and optionally also containing a dielectric fluid.

The amount of the oil compared to the amount of the Gyricon spheres in the organic phase dispersion should be such that the Gyricon spheres can each be coated with the dielectric oil, e.g., by surface energy attraction of the fluid around the surface of the spheres. As an example, from about 10 to about 95 percent by weight Gyricon spheres can be added to the organic phase dispersion. The monomer level in the organic phase may be from, for example, about 1 to about 100% (100% meaning neat monomer is the oil).

The organic phase dispersion is next brought into contact with an aqueous phase solution containing a monomer that coreacts with the monomer dissolved in the organic phase, for example a diamine or diol monomer. This solution is made by dissolving the monomer in water, preferably deionized water. The upper end of the monomer level in the aqueous phase is determined where the organic phase just barely becomes miscible with the aqueous phase. The monomer level thus may be, for example, from about 1 to about 50% monomer in aqueous solution.

Within the polymeric shell, the molar ratio of the organic soluble monomer to the aqueous soluble monomer is from about 1:1 to about 1:4, and preferably from about 1:1 to about 1:1.5.

In general, the interfacial condensation polymerization is conducted by first coating the Gyricon sphere with a first organic phase composition containing a first monomer dissolved in the organic solvent, and optionally a dielectric liquid, and subsequently exposing the coated Gyricon sphere to a second aqueous phase composition containing a second monomer dissolved in the aqueous solvent, whereby the first monomer and the second monomer are made to react to form the encapsulating shell.

In one embodiment, this is accomplished by first mixing the Gyricon spheres into the organic phase composition, followed by exposing the coated spheres to the aqueous phase composition. In this embodiment, the organic phase is brought into contact with the aqueous phase, for example by dropwise addition of the organic phase dispersion into the stirred aqueous phase solution. Upon contact, the monomers react (via a condensation reaction), forming a polymer skin around the droplets. As a result, the polymer shell is formed around the core of Gyricon sphere and the dielectric fluid. The reaction generally occurs under agitation, for example stirring. The polymeric shell typically forms very quickly upon contact of the two phases. However, the stirring and contact can continue for a period of, for example, about 1 minute to about 2 hours or more, if desired.

In another embodiment, the coating with the organic phase and exposure to the aqueous phase compositions can be done through the use of an ink-jet device, for example as detailed in U.S. application Ser. No. 09/772,565, now U.S. Pat. No. 6,406,747, incorporated herein by reference in its entirety. Briefly, the method comprises first jetting a precise amount of the organic phase composition onto the Gyricon sphere, which may be done by, for example, dropping the Gyricon sphere past the ink jet nozzle. The coating will wet the entire surface of the Gyricon sphere due to surface energies. The Gyricon sphere coated with the organic phase composition is then moved past an ink jet nozzle where it is jetted/sprayed with the aqueous phase composition, thereby causing reaction and the encapsulation.

In a still further embodiment, the coating with the organic phase and exposure to the aqueous phase compositions is conducted by dropping the Gyricon sphere through a fog of the organic phase composition and then subsequently dropping the coated Gyricon sphere through a fog of the aqueous phase composition. This method is also detailed in U.S. application Ser. No. 09/772,565, now U.S. Pat. No. 6,406,747, incorporated herein by reference in its entirety. Briefly in this embodiment, separate fogs are created of both the organic phase and aqueous phase compositions, and the Gyricon sphere is made to successively pass first through the fog of the organic phase and then through the fog of the aqueous phase. The Gyricon sphere may be dropped through both fogs successively if the fogs are made to have the organic phase fog about the aqueous phase fog. Like the ink jet embodiment above, the fog embodiment enables more precise control over the amounts of the compositions coated upon the sphere, thereby enabling more precisely sized encapsulated spheres to be derived and less waste of materials.

The condensation reaction can be conducted at room temperature for economies. However, elevated temperatures may be used, if desired, to aid in the reaction. Following the encapsulation, the encapsulated Gyricon elements are collected by any suitable method known in the art. Following collection, the encapsulated Gyricon elements may be washed, if desired. Further details regarding materials and processes are described in U.S. Pat. No. 6,445,490, herein incorporated by reference.

The present development provides a new method to produce encapsulated bichromal balls. The resulting bichromal balls are spherical or nearly spherical, separated from the capsule wall, possess a dipole moment and are free to rotate in response to the application of an electric field.

The present encapsulated bichromal balls may be dispersed into any suitable medium which may be a liquid, a solid, or a gas, to form a display or a display surface. When these encapsulated bichromal balls constitute voltage sensitive members, the capsules may be dispersed in any medium across which an electrical field may be impressed. Most commonly, this medium will be a solid, with the particle or particles dispersed in this solid while it is in a liquid phase. It may be subsequently hardened by chemical reaction, by cooling, or the like. The medium may also be a liquid, or a slurry, consisting of a liquid and solid particles, or solid particles whose purpose might be to immobilize the capsules. Indeed, any medium might be used to contain the capsules provided that it does not damage the shell of the capsule or diffuse undesirable chemicals across the shell.

A series of trials were conducted to further investigate the present discovery. A collection of microcapsules were made by the following non-limiting method.

Encapsulation of bichromal balls in the encapsulant liquid described herein was demonstrated as follows. To a 500-ml Morton reaction flask, 5.0 g gelatin (300 broom from swine) and 100 ml distilled water were added and the mixture was stirred for about half hour in a 60° C. water bath. 10 grams of 1 wt % sodium polyphosphate was added and the pH value was adjusted to about 4.0 to 4.5 with acetic acid to induce coacervate formation. After coacervate was formed, a mixture of 1 c St silicone oil containing 3 wt % of poly(dimethylsiloxane) disterate terminated and Gyricon T/W bichromal balls were added. The suspension mixture was stirred at a temperature range of from 60° C. to 30° C. for about 5 hours. Capsules were formed, which was then followed by proper crosslinking and freeze drying procedures.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A process of forming encapsulated bichromal balls, said process comprising:
   providing electrophoretic particles;
   blending said particles with (i) a low viscosity polysiloxane oil, and (ii) an effective amount of a bifunctional component material;
   providing a shell material; and,
   forming capsules by encapsulating said particles, polysiloxane oil, and bifunctional component material within a shell of said shell material wherein said bifunctional component material comprises a hydrocarbon functional group and a siloxane functional group.

2. The process of claim 1, wherein said low viscosity polysiloxane oil is selected from the group consisting of hexamethyldisiloxane oil, octamethyltrisiloxane oil, poly(dimethylsiloxane) oil, and combinations thereof.

3. The process of claim 1, wherein said bifunctional component material is selected from the group consisting of a poly(dimethylsiloxane) terminated with a hydrocarbon group, a copolymer of poly(dimethylsiloxane) with a polyolefin, a poly(dimethylsiloxane), and combinations thereof.

4. The process of claim 1, wherein said electrophoretic particles comprise pigments selected from the group consisting of titania, carbon black, and combinations thereof.

5. The process of claim 1, wherein said electrophoretic particles comprise composite particles of a pigment and a resin, wherein said pigment is selected from the group consisting of rutile titania, anatase titania, barium sulfate, zinc oxide, carbon black, Sudan blue, Hostaperm pink, and combinations thereof.

6. The process of claim 1, wherein said shell material is selected from the group consisting of polyphosphates, polycarboxylates, gelatin, and combinations thereof.

7. The process of claim 1, wherein said particles exhibit two colors.

8. The process of claim 5, wherein said resin is selected from the group consisting of polyethylene, polypropylene, copolymers of polyethylene and polypropylene, ethylene-vinyl acetate copolymers, and combinations thereof.

9. The process of claim 1, wherein said electrophoretic particles include fine powdered magnetic materials selected from the group consisting of ferrite, nickel, cobalt, iron, oxides thereof, and combinations thereof.

10. The process of claim 1, wherein said capsules have a size of from about 100 microns to about 300 microns.

11. The encapsulated bichromal balls produced by the process of claim 1.

12. A display device produced with the encapsulated bichromal balls of claim 11.

13. An encapsulated bichromal ball comprising a low viscosity polysiloxane oil, a bifunctional component material and a bichromal ball encapsulated with an encapsulating shell material wherein said bifunctional component material comprises a hydrocarbon functional group and a siloxane functional group.

14. The encapsulated bichromal ball of claim 13, wherein the low viscosity polysiloxane oil is selected from the group consisting of hexamethyldisiloxane oil, octamethyltrisiloxane oil, poly(dimethylsiloxane) oil, and combinations thereof.

15. The encapsulated bichromal ball of claim 13, wherein said bifunctional component material is selected from the group consisting of a poly(dimethylsiloxane) terminated with a hydrocarbon group, a copolymer of poly(dimethylsiloxane) with a polyolefin, a poly(dimethylsiloxane), and combinations thereof.

16. A suspending fluid for a bichromal ball comprising a low viscosity polysiloxane oil and a bifunctional component material wherein said bifunctional component material comprises a hydrocarbon functional group and a siloxane functional group.

17. The suspending fluid of claim 16, wherein the low viscosity polysiloxane oil is selected from the group consisting of hexamethyldisiloxane oil, octamethyltrisiloxane oil, poly(dimethylsiloxane) oil, and combinations thereof.

18. An encapsulation process comprising:
   (i) forming an emulsion of a continuous aqueous phase comprising water, a cationic material, and an anionic material, and a disperse phase comprising a plurality of droplets of a silicon oil, included therein one or more particles, wherein said silicon oil further contains an additive material comprised of a polysiloxane having an organic component capable of adsorbing on the surface of the particles;
   (ii) forming a gellation shell around each of the droplets from the complex coacervation of the cationic material and the anionic material; and,
   (iii) hardening the gellation shell.

19. The encapsulation process of claim 18, wherein particles comprise bichromal beads.

20. The encapsulation process of claim 18, wherein the polysiloxane is selected from the group consisting of a poly(dimethylsiloxane) terminated with a hydrocarbon group, a copolymer of poly(dimethylsiloxane) with a polyolefin, a poly(dimethylsiloxane), and combinations thereof.

* * * * *